US012707354B2

(12) United States Patent
Da Silva et al.

(10) Patent No.: US 12,707,354 B2
(45) Date of Patent: Aug. 11, 2026

(54) MEASUREMENT CONFIGURATION MANAGEMENT ON L1 MOBILITY

(71) Applicant: Telefonaktiebolaget LM Ericsson (publ), Stockholm (SE)

(72) Inventors: Icaro Leonardo Da Silva, Solna (SE); Helka-Liina Määttänen, Espoo (FI); Pradeepa Ramachandra, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 502 days.

(21) Appl. No.: 18/036,714

(22) PCT Filed: Dec. 10, 2021

(86) PCT No.: PCT/IB2021/061596

§ 371 (c)(1),
(2) Date: May 12, 2023

(87) PCT Pub. No.: WO2022/123537

PCT Pub. Date: Jun. 16, 2022

(65) Prior Publication Data

US 2024/0022980 A1 Jan. 18, 2024

Related U.S. Application Data

(60) Provisional application No. 63/124,192, filed on Dec. 11, 2020.

(51) Int. Cl.
*H04W 36/00* (2009.01)
*H04B 7/06* (2006.01)

(52) U.S. Cl.
CPC .... *H04W 36/0085* (2018.08); *H04B 7/06968* (2023.05); *H04W 36/0055* (2013.01)

(58) Field of Classification Search
CPC .......... H04W 36/0085; H04W 36/0055; H04B 7/088; H04B 7/06968
See application file for complete search history.

(56) References Cited

U.S. PATENT DOCUMENTS

2022/0167453 A1* 5/2022 Liu .......................... H04W 76/15
2022/0312501 A1* 9/2022 Lei .......................... H04W 72/0446
2023/0096338 A1* 3/2023 Koskela .................. H04L 5/0091
370/331

OTHER PUBLICATIONS

International Search Report and Written Opinion of the International Searching Authority, PCT/IB2021/061596, mailed Mar. 29, 2022, 11 pages.

(Continued)

*Primary Examiner* — Rasheed Gidado
(74) *Attorney, Agent, or Firm* — Sage Patent Group

(57) ABSTRACT

A method of operating a user equipment, UE, configured with a plurality of transmission configurations for lower layer mobility and associated with one or more cells, each cell associated with one or more physical cell identities, PCIs, in a wireless communication network is provided. The method includes receiving a lower layer signaling that includes an indication of a change of transmission configuration from a first transmission configuration to a second transmission configuration from the plurality of transmission configurations, and in response to receiving the lower layer signaling, performing the change of transmission configuration and performing an action related to a measurement configuration. The action includes one of performing an update to at least one element in the measurement configuration based on the second transmission configuration, and applying a stored measurement configuration associated with the second transmission configuration.

12 Claims, 6 Drawing Sheets

(56) References Cited

OTHER PUBLICATIONS

Qualcomm Incorporated, "Enhancement on Multi-beam Operation," 3GPP TSG RAN WG1 Meeting #103-e, R1-2009250, Oct. 26-Nov. 13, 2020, 12 pages.
Ericsson, "TP for 38.331 on CHO," 3GPP TSG-RAN WG2 #108, R2-1914638, Reno, Nevada, USA, Nov. 18-22, 2019, 39 pages.
ZTE, "Discussion on Multi-TRP inter-cell operation," 3GPP TSG RAN WG1 #102-e, R1-2005456, e-Meeting, Aug. 17-28, 2020, 3 pages.
Samsung, "New WID: Furthter enhancements on MIMO for NR," 3GPP TSG RAN Meeting #86, RP-193133, Sitges, Spain, Dec. 9-12, 2019, 5 pages.
3GPP TS 38.300 v16.3.0 (Sep. 2020); 3rd Generation Partnership Project; Technical Specification Group Radio Access Network; NR; NR and NG-RAN Overall Description; Stage 2 (Release 16); 148 pages.
3GPP TS 38.331 v16.2.0 (Sep. 2020); 3rd Generation Partnership Project; Technical Specification Group Radio Access Network; NR; Radio Resource Control (RRC) protocol specification (Release 16); 921 pages.
3GPP TS 38.321 v16.2.1 (Sep. 2020); 3rd Generation Partnership Project; Technical Specification Group Radio Access Network; NR; Medium Access Control (MAC) protocol specification (Release 16) 154 pages.
3GPP TS 38.211 v16.3.0 (Sep. 2020); 3rd Generation Partnership Project; Technical Specification Group Radio Access Network; NR; Physical channels and modulation (Release 16); 133 pages.
3GPP TS 38.213 v16.3.0 (Sep. 2020); 3rd Generation Partnership Project; Technical Specification Group Radio Access Network; NR; Physical layer procedures for control (Release 16); 179 pages.
3GPP TS 38.133 v16.5.0 (Sep. 2020); 3rd Generation Partnership Project; Technical Specification Group Radio Access Network; NR; Requirements for support of radio resource management (Release 16); 1608 pages.

* cited by examiner

MEASUREMENT CONFIGURATION MANAGEMENT ON L1 MOBILITY

CROSS REFERENCE TO RELATED APPLICATIONS

The present application is a 35 U.S.C. § 371 national stage application of PCT International Application No. PCT/IB2021/061596 filed on Dec. 10, 2021, entitled "MEASUREMENT CONFIGURATION MANAGEMENT ON L1 MOBILITY," which in turn claims the benefit of and priority to U.S. Provisional Patent Application No. 63/124,192 filed Dec. 11, 2020, entitled "MEASUREMENT CONFIGURATION MANAGEMENT ON L1 MOBILITY," the disclosure of which are hereby incorporated herein by reference in their entirety.

BACKGROUND

The present disclosure relates generally to communications, and more particularly to communication methods and related devices and nodes supporting wireless communications.

A 3GPP New Radio (NR) communication network may configure a user equipment (UE) to perform various types of measurements, including NR measurements, inter-Radio Access Technology (RAT) measurements of Evolved Universal Terrestrial Radio Access (E-UTRA) frequencies, and inter-RAT measurements of UTRA-frequency division duplexing (FDD) frequencies.

The network may configure the UE to report the measurement information based on synchronization signal/physical broadcast channel (SS/PBCH) block(s), including measurement results per SS/PBCH block, measurement results per cell based on SS/PBCH block(s) and SS/PBCH block(s) indexes.

The network may configure the UE to report measurement information based on channel state information reference signal (CSI-RS) resources, such as measurement results per CSI-RS resource, measurement results per cell based on CSI-RS resource(s) and CSI-RS resource measurement identifiers. Additionally, the network may configure the UE to perform channel busy ratio (CBR) measurements for sidelink channels.

The network may configure the UE to report the cross-link interference (CLI) measurement information based on sounding reference signal (SRS) resources, including measurement results per SRS resource and SRS resource(s) indexes. The network may additionally configure the UE to report CLI measurement information based on CLI-received signal strength indicator (RSSI) resources, such as measurement results per CLI-RSSI resource and CLI-RSSI resource(s) indexes.

In NR, measurement configuration/re-configuration is performed through explicit signaling to the UE, based on the measConfig parameter of the information element (IE) MeasConfig. The network may configure a UE that is in radio resource control (RRC) connected state (i.e., RRC_CONNECTED) to perform measurements. The network may configure the UE to report the measurements in accordance with a measurement configuration or perform conditional reconfiguration evaluation in accordance with a conditional reconfiguration. The measurement configuration is provided by means of dedicated signaling, i.e., using the RRCReconfiguration or RRCResume messages.

In case a handover is triggered (or more generally, reconfiguration with sync, that also includes primary serving cell (PSCell) addition and PSCell change), the source gNodeB determines to trigger a handover and transmits a current measurement configuration the UE has (as part of the access stratum, AS, context of the UE) in a Handover Preparation container to the target gNodeB. Upon reception, the target gNodeB may accept the handover request and generate an RRCReconfiguration to be applied by the UE. That RRCReconfiguration can include a measConfig measurement configuration generated by the target gNodeB, taking into account the need codes of the IE MeasConfig. For example, not including a field with need code M indicates to the UE that the UE is to use the same configuration in the target as in the source, as shown in FIG. 1.

Referring to FIG. 1, at step 1, the source gNB configures the UE measurement procedures and the UE reports according to the measurement configuration.

At step 2, the source gNB decides to handover the UE, based on MeasurementReport and radio resource management (RRM) information.

At step 3, the source gNB issues a Handover Request message to the target gNB passing a transparent RRC container with necessary information to prepare the handover at the target side.

At step 4, admission Control may be performed by the target gNB.

At step 5, the target gNB prepares the handover with L1/L2 and sends the HANDOVER REQUEST ACKNOWLEDGE to the source gNB, which includes a transparent container to be sent to the UE as an RRC message to perform the handover.

At step 6, the source gNB triggers the Uu handover by sending an RRCReconfiguration message to the UE, containing the information required to access the target cell.

The RRM configuration can include both beam measurement information (for layer 3 mobility) associated to SSB(s) and CSI-RS(s) for the reported cell(s) if both types of measurements are available. Also, if carrier aggregation (CA) is configured, the RRM configuration can include the list of best cells on each frequency for which measurement information is available. And the RRM measurement information can also include the beam measurement for the listed cells that belong to the target gNB.

In RRC, the reception of an RRCReconfiguration (during the handover) leads to the procedure shown in FIG. 2. When the UE receives the RRCReconfiguration message, if the RRCReconfiguration message includes a measurement configuration (measConfig), the UE performs the measurements procedure and sets the contents of the RRCReconfigurationComplete message. This reconfiguration procedure is described in section 5.3.5.3 of [2], for example, and the MeasConfig IE is provided in section 6.3.2 of [2].

The IE MeasConfig specifies measurements to be performed by the UE, and covers intra-frequency, inter-frequency and inter-RAT mobility as well as configuration of measurement gaps.

Measurement Configuration Upon Handovers in Long Term Evolution (LTE)

In LTE, as in NR, explicit measurement configuration also exists in handovers. However, in addition, the UE performs a set of UE autonomous actions upon reception of an RRCConnectionReconfiguration message including the mobilityControlInfo, before it applies a measurement configuration included in the RRCConnectionReconfiguration message. (see also section 5.3.5.4 of [2]).

In summary these autonomous actions are the following:

- Swapping of measurement object identifiers in case of an inter-frequency handover. For example, if we assume in the source cell the UE uses for the PCell a frequency F0 whose measObjectId=1, and the target cell has a primary frequency Fx whose measObject=7, there is a swapping of measurement object identities, so that the events that were configured and meant to be used by the serving frequency continues to be used in a similar manner, but now with a new serving frequency. Notice that the explicit signaling enables the network to perform further changes e.g. remove some measId(s), and/or add further events not configured by the source cell/network node.

- Removal of measurement reporting entries within VarMeasReportList.
- Stopping of the periodical reporting timer or timer T321, whichever one is running, as well as associated information (e.g. timeToTrigger) for all measId.
- Releasing of the measurement gaps (configured by E-UTRA RRC), if activated.
- Performing the measurement identity autonomous removal if the associated reportConfig concerns an event involving a serving cell while the concerned serving cell is not configured.

L1/L2 Inter-Cell Centric Mobility in Rel-17

Currently, there are efforts to standardize L1/L2 centric inter-cell mobility (or L1-mobility, inter-physical cell identity (PCI) transmission configuration indicator (TCI) state change/update/modification, etc., to obtain aggressive reduction in latency and overhead, not only for intra-cell, but also for L1/L2 centric inter-cell mobility.

Although it has not been decided how a L1/L2 inter-cell centric mobility should be standardized, it is presently understood that the UE receives a L1/L2 signaling (instead of RRC signaling) indicating a TCI state (e.g. for the physical downlink control channel, PDCCH) possibly associated to an SSB whose PCI is not necessarily the same as the PCI of the cell the UE has connected to, for example, via connection resume or connection establishment. Moreover, it may be the case that the frequency band and/or SSB absolute radio frequency channel number (ARFCN) of the current serving cell is also changed during the L1/L2 procedure.

L1/L2-centric inter-cell mobility is illustrated in FIG. 3. As shown therein, a UE at time T1 is connected to a cell having PCI-1. The UE may connect to cells having different PCIs (e.g., PCI-2, PCI3 and PCI-4 at different times T2T3, T4, respectively, using L1/L2 signaling rather than RRC signaling.

In other words, the L1/L2-centric inter-cell mobility procedure can be interpreted as a beam management operation expanding the coverage of multiple SSBs associated to multiple PCIs (e.g. possibly associated to the same cell or different cells), possibly being an inter-frequency beam management.

SUMMARY

A method of operating a user equipment, UE, configured with a plurality of transmission configurations for lower layer mobility and associated with one or more cells, each cell associated with one or more physical cell identities, PCIs, in a wireless communication network is provided. The method includes receiving a lower layer signaling that includes an indication of a change of transmission configuration from a first transmission configuration to a second transmission configuration from the plurality of transmission configurations, and in response to receiving the lower layer signaling, performing the change of transmission configuration and performing an action related to a measurement configuration. The action includes one of performing an update to at least one element in the measurement configuration based on the second transmission configuration, and applying a stored measurement configuration associated with the second transmission configuration.

A method of operating a radio access network, RAN, node in communication with a user equipment, UE, configured with a plurality of transmission configurations for lower layer mobility and associated with one or more cells, each cell associated with one or more physical cell identities, PCIs is also provided. The method includes transmitting a lower layer signaling to the UE indicating a change of transmission configuration from a first transmission configuration to a second transmission configuration, and receiving a measurement report from the UE, the measurement report being based on at least one of measurements performed based on at least one element in a measurement configuration updated by the UE based on the second transmission configuration, and measurements performed based on a stored measurement configuration associated with the second transmission configuration.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

A problem addressed by some embodiments described herein is that if the L1/L2 inter-cell centric mobility feature is available for a capable UE within an area covered by a set of serving and non-serving cells associated to multiple PCIs, e.g. PCI-1, PCI-2, PCI-3, PCI-4, the UE can rely on beam management procedures, such as L1 measurements/reporting and medium access control (MAC) control element (CE)/downlink control information (DCI) indications or any other lower layer signaling such as in the RLC, MAC or PHY layers in the protocol stack. However, this area will most likely not be an "infinite" area. That is, the potential areas that the UE may engage in mobility towards would likely be an area within the control of the same distributed unit (DU) and/or common baseband pool.

Figure 1:
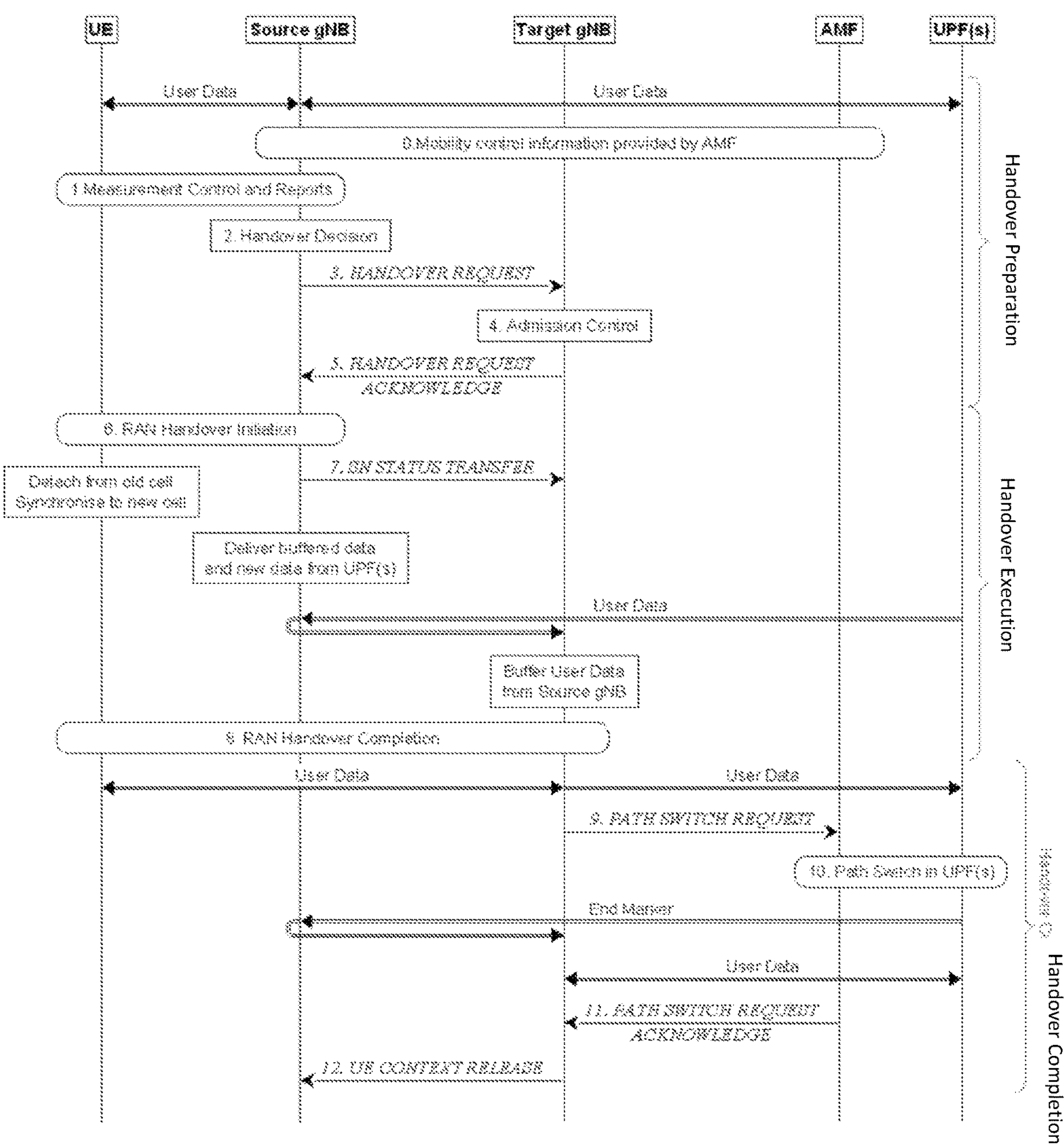
FIG. 1 illustrates a handover procedure in NR.
Figure 2:
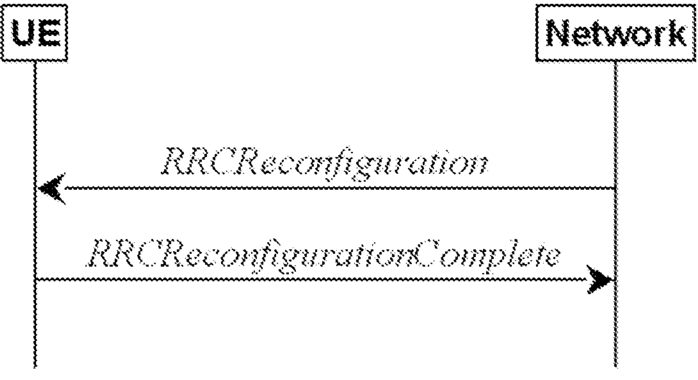
FIG. 2 illustrates RRC reconfiguration in NR.
Figure 3:
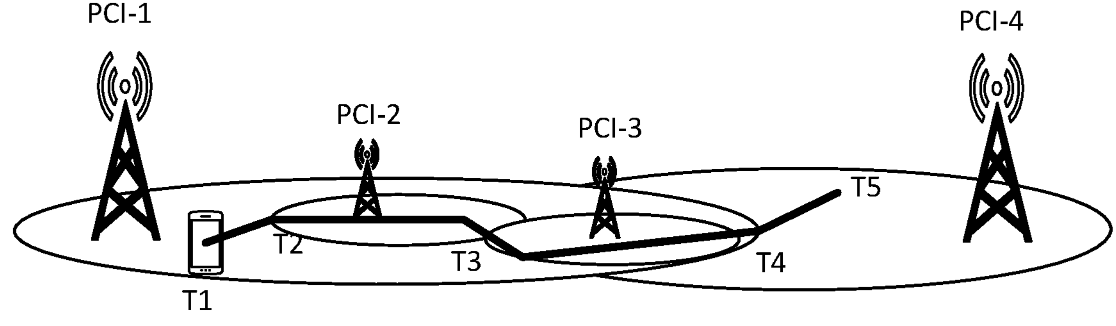
FIG. 3 illustrates L1/L2-centric inter-cell mobility in NR.
Figure 4:
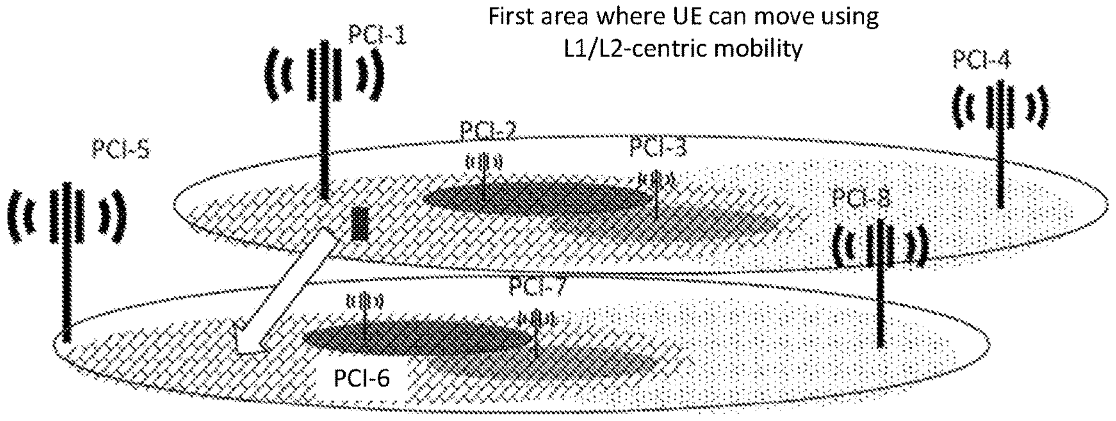
FIG. 4 illustrates mobility from a first area supporting L1/L2-centric mobility to a second area supporting L1/L2-centric mobility.

Thus, two scenarios are very likely to happen. In a first scenario, an RRC_CONNECTED UE within a first area for which L1/L2-centric mobility is supported (and being configured with L1/L2-centric mobility within this first area) may move towards a second area for which L1/L2-centric mobility is supported. In a second scenario, an RRC_CONNECTED UE within a first area for which L1/L2-centric mobility is NOT supported (i.e., NOT configured with L1/L2-centric mobility within this first area) may move towards a second area for which L1/L2-centric mobility is supported. FIG. 4 illustrates the first scenario, and FIG. 5 illustrates the second scenario.

Figure 5:
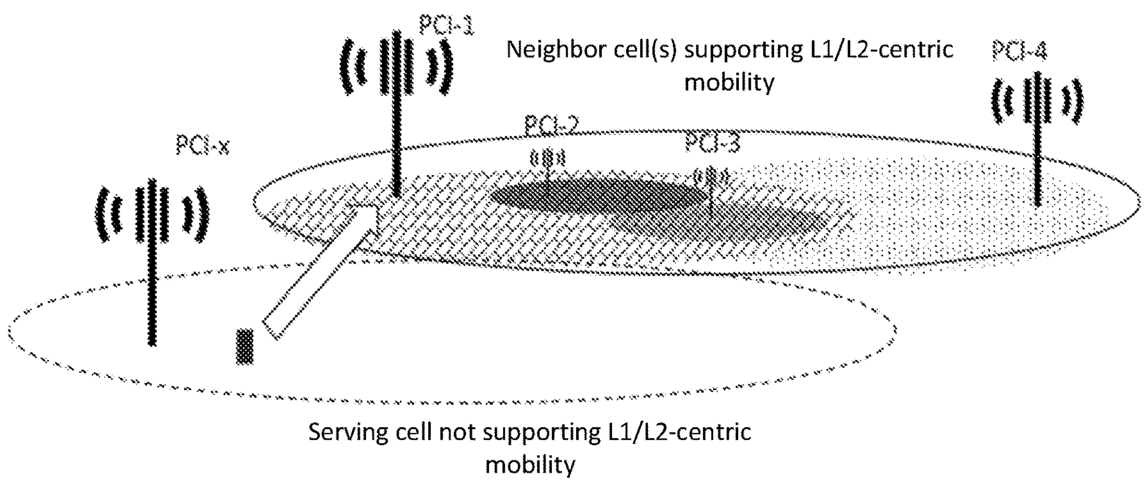
FIG. 5 illustrates mobility from a first area not supporting L1/L2-centric mobility to a second area supporting L1/L2-centric mobility.

As shown in FIGS. 4 and 5, at some point, a UE that is capable of L1/L2-centric inter-cell mobility needs to be handed over with RRC signaling, i.e. with a legacy handover. That requires that while configured with L1/L2-centric inter-cell mobility, the UE must continue to perform RRM measurements (based on a measConfig) and trigger measurement reports to be transmitted to the network, so the network takes mobility decisions (e.g., PSCell change, handovers, etc.).

Thus, in both scenarios a UE that is performing L1/L2-centric inter-cell mobility from a serving cell to a configured non-serving cell via MAC CE(s) (and/or any other form of L1/L2 signaling) is required to continue performing RRM measurements according to a measurement configuration upon the reception of the L1/L2 signaling to support potential handovers, that is, to support potential RRC based mobility to an area either not supporting L1/L2-centric mobility or to an area supporting L1/L2-centric mobility for a different set of non-serving cells, such as associated to a neighbor gNodeB. In addition, a change in serving cell, even if that is via L1/L2 signaling, may still require a change in measurement configuration.

The problem is that, differently from a handover, an L1/L2 signaling for mobility, such as a MAC CE including a TCI state identifier, cannot carry a measurement configuration, so that upon reception, the UE can be reconfigured for performing measurements. Hence, either the UE cannot be configured to perform RRM measurements while it is configured with L1/L2-centric inter-cell mobility or the UE needs to continue to use the same measurement configuration it may have received when it transitions from IDLE/INACTIVE to CONNECTED (or in the last reconfiguration with sync, which was RRC based).

Some embodiments described herein provide a method at a wireless terminal, such as a UE, that includes receiving at least one TCI state configuration, wherein at least one of the TCI state configurations has a Quasi-Co-Location (QCL) configuration associated to at least one non-serving cell. The serving cell can be in a non-serving frequency. The QCL configuration can correspond to a reference signal configuration, e.g., an SSB index and/or a CSI-RS index of a non-serving cell.

The UE receives a MAC CE indicating one of the configured TCI states and determines that the QCL source reference signal is associated to a non-serving cell. The MAC CE may, for example, be a TCI state update for PDSCH, PDCCH, PUCCH, PUSCH, SRS or a combined MAC CE for two or more of the mentioned downlink/uplink channels.

In response to the MAC CE, the UE performs at least one of the following actions related to a measurement configuration:

A) The UE autonomously perform updates to at least one element in the measurement configuration; or B) The UE applies a stored measurement configuration associated to a non-serving cell.

In some embodiments, a new MAC CE may be defined that directly updates the measurement configuration, or any of the options described above that the UE would consider. Additionally, the embodiments can define how the UE considers the filtered measurements related to options A, B or C, that are either deactivated or activated by the MAC CE. For example, if a deactivation MAC CE deactivates a UEs measurements for a cell (e.g., cell 1), the UE may either immediately discard the saved measurement data, or pause the filter for the duration of a timer (e.g., T1). If a measurement related to the cell 1 is activated while timer T1 is running, the UE may combine the earlier obtained measurements to the new measurement samples.

Some embodiments provide a method at a network node, such as a gNodeB (gNB). The method includes transmitting one or more TCI state configurations, wherein at least one of the TCI state configurations has a QCL configuration (e.g., a reference signal configuration e.g. an SSB index and/or a CSI-RS index) associated to at least one non-serving cell. The non-serving cell can be in a non-serving frequency.

The method further includes transmitting a MAC CE indicating one of the configured TCI states. The network node updates the UE's measurement configuration in the UE's AS context at least based on one of the following UE actions:

A) The UE autonomously performs an update to the measurement configuration; or

B) The UE applies a stored measurement configuration associated to a non-serving cell.

That requires the network node to generate a MeasConfig IE for at least one of the configured non-serving cell(s) and provide the MeasConfig IE to the UE.

According to some embodiments, a UE capable of L1/L2-centric inter-cell mobility can efficiently support the network by reporting performed RRM measurements so that the UE may be handed over with RRC signaling when needed. In other words, some embodiments described herein make it possible for the UE to continue to perform RRM measurements (based on a measConfig) and trigger measurement reports (e.g. event based) to be transmitted to the network while configured with L1/L2-centric inter-cell mobility, so the network takes mobility decisions (e.g., PSCell change, handovers, etc.).

The present disclosure uses the terminology in the NR specification as primary examples and refers to some features addressed in Rel-17. However, it will be appreciated that the embodiments described herein may also be applicable in the context of 6G research, which is often label as Distributed-MIMO (D-MIMO) and cell-less mobility. Some embodiments may also be relevant for other multi-beam transmission schemes, such as in Tera Hertz communications system, which may be the case in some frequencies possibly allocated to 6G and/or 5G enhancements.

The term "beam" used in the present disclosure can correspond to a reference signal that is transmitted in a given direction. For example, if may refer to an SS/PBCH Block (SSB) or layer 3 configured CSI-RS. During a half-frame, different SSBs may be transmitted in different spatial directions (i.e., using different beams, spanning the coverage area of a cell). That corresponds to different SSBs meaning different beams.

The term "TCI state" may also be considered as a synonym for beam in the sense that an indication of a TCI state can correspond to an indication of a beam, and/or an SSB index and/or a CSI-RS index.

The term "QCL" may also be considered as a synonym for beam in the sense that an indication of a QCL source associated to a TCI state can correspond to an indication of a beam, and/or an SSB index and/or a CSI-RS index.

The term PCI and/or PCI of an SSB as used herein corresponds to the physical cell identity encoded by a Primary Synchronization Sequence (PSS) and an a Secondary Synchronization Sequence (SSS) that are comprised in an SSB, wherein the PSS and SSS encode a PCI.

The present disclosure refers to "cells" or a "set of cells" wherein the UE can be configured with to perform L1/L2 centric mobility. These set of cells may be called a set of intra-frequency neighbor cells the UE can perform measurements on and can perform a handover/reconfiguration with sync to, or a set of intra-frequency non-serving cells or simply a set of non-serving cells. These may be a set of inter-frequency neighbors that are non-serving cells wherein their SSB's frequency location (e.g., SSB ARFCN) are not in the same frequency location as a serving cell SSB frequency location (i.e., different ARFCN).

The terms CORESET and PDCCH configuration are used interchangeably to indicate a control channel configuration, including an indication of frequency and time locations the UE monitors for scheduling grants from the network, e.g., when it is in Connected state. A CORESET can be defined as a time/frequency control resource set in which to search for downlink control information.

The present disclosure uses the term L1/L2 inter-cell centric mobility or simply L1 mobility or, L1/L2 centric mobility to refer to a procedure where the UE change cells (e.g. changes SpCell, like PCell change or PSCell change) upon reception of a L1 and/or L2 signaling, such as upon the reception of a MAC CE.

Consider specifications in [2] for RRC as a reference for the omitted IEs and field in the messages and/or IEs that are proposed to be extended to implement the systems/methods described herein.

Figure 6:
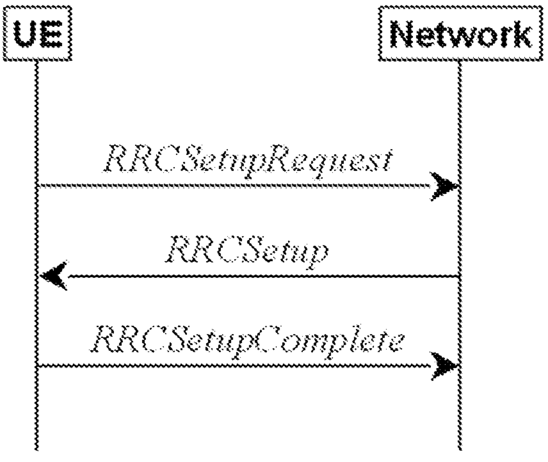
FIG. 6 illustrates an RRC setup procedure in NR.
Figure 7:
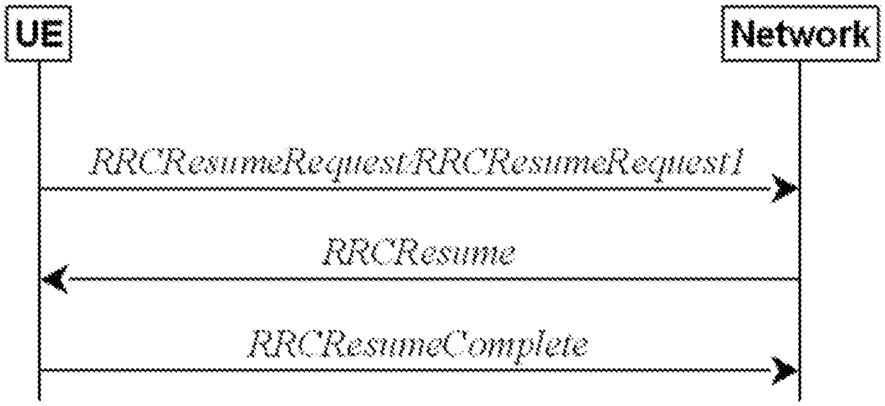
FIG. 7 illustrates an RRC resume procedure in NR.

In the present disclosure, the term "initial serving cell" refers to the PSCell and/or the PCell the UE is configured with via RRC signaling. For example, during a transition from RRC_IDLE or RRC_INACTIVE to RRC_CONNECTED, the initial serving cell is the cell the UE was camping when it performs random access/connection setup/resume, as shown in FIGS. 6 and 7. Also see section 5.3.3 of [2].

For example, during a reconfiguration with sync (reception of an RRCReconfiguration including a ReconfigurationWithSync) the target cell can be considered as an initial serving cell (which may be a PCell during a handover, and/or PSCell during a PSCell change).

Figure 8:
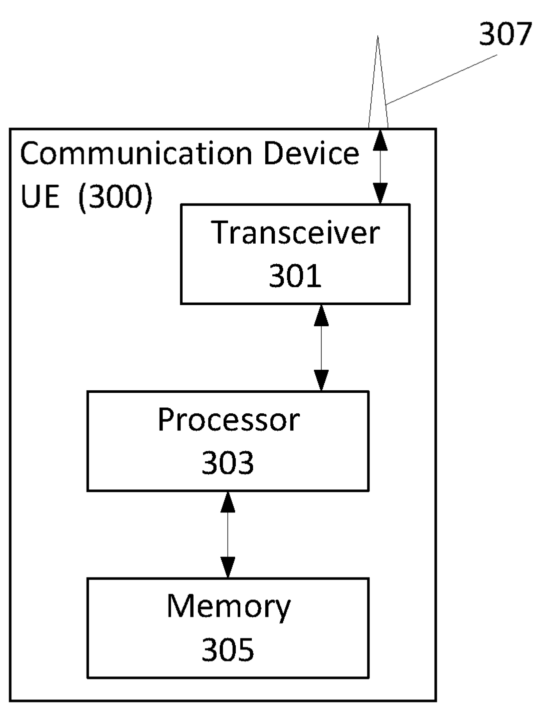
FIG. 8 is a block diagram illustrating a wireless device (UE) according to some embodiments of inventive concepts.

FIG. 8 is a block diagram illustrating elements of a communication device 300 (also referred to as a mobile terminal, a mobile communication terminal, a wireless device, a wireless communication device, a wireless terminal, mobile device, a wireless communication terminal, UE, a user equipment node/terminal/device, etc.) configured to provide wireless communications according to embodiments of inventive concepts. As shown, communication device UE may include an antenna, and transceiver circuitry 301 including a transmitter and a receiver configured to provide uplink and downlink radio communications with a base station(s) of a radio access network. Communication device UE may also include processing circuitry 303 coupled to the transceiver circuitry, and memory circuitry 305 coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device UE may also include an interface (such as a user interface) coupled with processing circuitry 303, and/or communication device UE may be incorporated in a vehicle.

As discussed herein, operations of communication device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with reference to FIG. 9 related to wireless communication devices). According to some embodiments, a communication device UE 300 and/or an element(s)/function(s) thereof may be embodied as a virtual node/nodes and/or a virtual machine/machines.

Operations of a user equipment UE 300 (implemented using the structure of FIG. 8) will now be discussed with reference to the flow chart of FIG. 9 according to some embodiments of inventive concepts. For example, modules may be stored in memory 305 of FIG. 8, and these modules may provide instructions so that when the instructions of a module are executed by respective UE processing circuitry 303, processing circuitry 303 performs respective operations of the flow chart.

Figure 9:
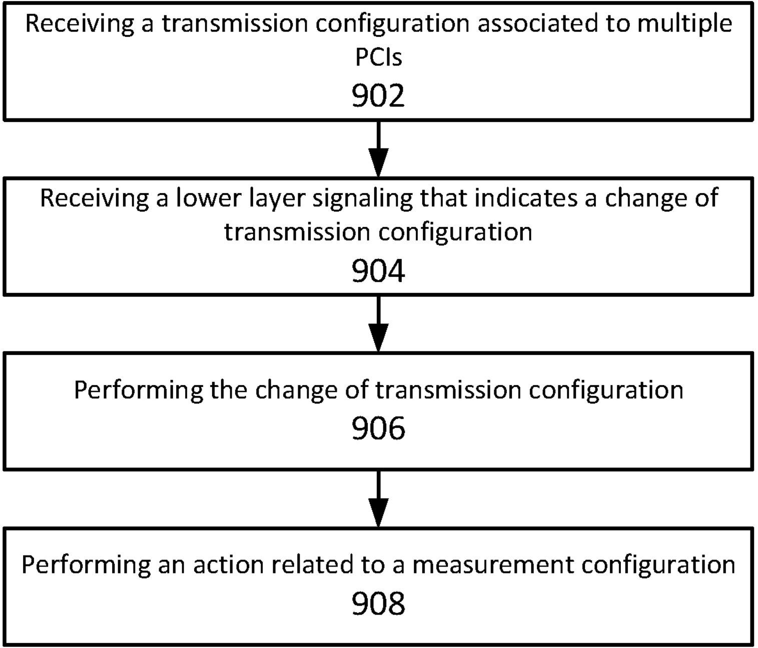
FIG. 9 is a flow chart illustrating operations of a user equipment according to some embodiments of inventive concepts.

Referring to FIG. 9, a method of operating a user equipment, UE (300) that is configured with a plurality of transmission configurations for lower layer mobility and associated with one or more cells. Each cell is associated with PCIs in a wireless communication network. The method includes receiving (902) a transmission configuration for lower layer mobility associated to multiple PCIs, wherein the lower layer mobility is used to trigger a change of at least a cell or a PCI upon reception of a lower layer signaling. The UE receives (904) a lower layer signaling that indicates a change in transmission configuration from a first transmission configuration to a second transmission configuration. In response to the lower layer signaling, the UE performs (906) the change in transmission configuration. Further, in response to receiving the lower layer signaling, the UE performs (908) an action related to a measurement configuration. The action includes one of: performing an update to at least one element in a measurement configuration, and applying a stored measurement configuration associated to the at least one of the multiple PCIs.

It should be understood that the UE is configured for L1/L2 mobility, which means that the UE is configured to perform mobility between different cells, including serving cells and non-serving cells having different PCIs in response to L1 or L2 signaling, such as signaling via MAC CEs, as opposed to higher layer mobility, such as RRC-based mobility. The UE is also configured with a plurality of transmission configurations. For example, the network node can send the transmission configurations to the UE. The transmission configuration may include at least one TCI state configuration, wherein at least one of the TCI state configurations has a QCL configuration (e.g. a reference signal configuration e.g. an SSB index and/or a CSI-RS index) associated to at least one non-serving cell. The non-serving cell can be in a non-serving frequency.

The QCL configuration may include a reference to a QCL source reference signal. The lower layer signaling corresponds to L1/L2 signaling and may include a MAC CE indicating one of the configured TCI states. When the UE receives a MAC CE, which indicates a TCI state configuration to activate, the UE may determine that if the QCL configuration associated with the indicated TCI state is associated to a non-serving cell. This means that the UE is changing from a first/current transmission configuration to a second configuration. For example, the first configuration may be associated with the UE being served by a serving cell associated with a first PCI. The second configuration may be associated with the UE being served by a serving cell associated with a second PCI or a non-serving cell associated with a third PCI. Upon receiving this indication of change of transmission configuration, the UE also needs to change measurement configurations from the current (first) measurement configuration to a second measurement configuration. The second measurement configuration can be an updated version of the first measurement configuration.

The MAC CE may be for example a TCI state update for PDSCH, PDCCH, PUCCH, PUSCH, SRS or a combined MAC CE for two or more of the mentioned downlink/uplink channels.

Alternatively, the UE may receive a MAC CE that directly updates the measurement configuration.

Upon receiving a MAC CE that includes a lower layer mobility switching command from the network, the UE's lower layers may send an indication to the upper layers (e.g., layer 3) of actions related to a measurement configuration that the UE performs or has performed, such as:

A) The UE may perform at least one update to the measurement configuration; or

B) The UE may apply a stored measurement configuration associated to a non-serving cell.

Each of these actions is described in more detail below.

A) The UE may autonomously perform at least one of the following updates to the measurement configuration.

For example, the UE can decide to remove a particular measurement, identified by a measurement identifier (measID). For each measurement identifier included in the UE's current measurement configuration, e.g. in measIdList within VarMeasConfig, if periodic measurement reporting is configured (for example, if report type is set to periodical), the UE may remove that measurement identifier from the UE configuration (e.g. remove that measId from the measIdList within VarMeasConfig).

In some embodiments, the removal of the measurement identifier may be performed only if the corresponding measurement configuration has an indication that this measurement can be autonomously removed upon change of the serving cell via L1 configuration. Such an indication could be provided in the measConfig or in the reportConfig or in the measIdToAddModList.

If cell global identity (CGI) measurement reporting is configured, in some embodiments, the UE may abort the CGI measurement and remove the associated measurement identifier from the UE configuration (e.g. remove that measId from the measIdList within VarMeasConfig).

Further, the removal of this measurement identifier may be performed only if the corresponding measurement configuration has an indication that this measurement can be autonomously removed upon change of the serving cell via L1 configuration. Such an indication could be provided in the measConfig or in the reportConfig or in the measIdToAddModList.

If a deactivation MAC CE deactivates UEs measurements for a cell (e.g., cell 1), the UE may either immediately discard the saved measurement data, or pause the filter for the duration of timer T1. If a measurement related to the cell 1 is activated while timer T1 is running the UE may combine the earlier obtained measurements to the new measurement samples.

If the lower layer signaling (e.g. MAC CE) indicates a TCI state whose QCL configuration is associated to a non-serving cell whose SSB frequency is different from the SSB frequency of the current serving cell, or, if a direct MAC CE indicates a measurement configuration, or measurement identity, update at least one measurement identity (measId) in the current UE's configuration as follows:

If a measurement object identifier (measObjectId) value corresponding to the target primary frequency (e.g. SSB frequency associated to the non-serving cell) exists in the configuration e.g. in measObjectList within VarMeasConfig, then for each measurement identity (measId) value in the configuration e.g. in measIdList, if the measId value is linked to the measObjectId value corresponding to the source primary frequency, the UE may link this measId value to the measObjectId value corresponding to the target primary frequency, else if the measId value is linked to the measObjectId value corresponding to the target primary frequency the UE may link this measId value to the measObjectId value corresponding to the source primary frequency.

Alternatively, in some embodiments, the UE may remove all measurement identity (measId) values that are linked to the measObjectId value corresponding to the source primary frequency (the serving cell before the L1 based switching). In some other embodiments, there is no change to the rest of the measIDs.

In this case, for each measId included in the measIdList within VarMeasConfig, if (a) the associated reportConfig concerns an event involving a serving cell while the concerned serving cell is not configured after the serving cell switch; or if (b) the associated measID concerns a periodical reporting of measurements on a frequency that is not configured after the serving cell switch; or if (c) the associated reportConfig concerns the system frame number (SFN) and frame timing difference (SFTD) measurement involving reportSFTD-Meas set to pSCell, then the UE may remove the measId from the measIdList within the VarMeasConfig, remove the measurement reporting entry for this measId from the VarMeasReportList, if included, stop the periodical reporting timer if running, and/or reset the associated information (e.g. timeToTrigger) for this measId.

The UE autonomous removal of measId's may apply only for measurement events A1, A2, A6, and also may apply for events A3 and A5 if configured for PSCell and W2 and W3 and V1 and V2 and event involving reportSFTD-Meas set to pSCell, if configured.

The UE may further remove all measurement reporting entries from the measurement configuration, e.g. entries within VarMeasReportList and stop the periodical reporting timer or timer T321, whichever one is running, as well as associated information (e.g. timeToTrigger) for all measId. If the UE was configured with a measurement gap to perform measurements on the frequency in which the UE's new serving cell resides, then the UE may release the associated measurement gaps, if activated.

If the UE was configured with a measurement gap to perform measurements on the frequency in which the UE's new serving cell resides and if the UE needs measurement gap to perform the previous serving cell related frequency measurements and if the UE is required to perform previous serving frequency related measurements, then the UE may swap the usage of the measurement gap that was previously configured/used to perform the current serving frequency related measurements with the previous serving frequency related measurements B) The UE may apply a stored measurement configuration associated to a non-serving cell (e.g., from a second transmission configuration).

In one embodiment, the UE has been configured with a plurality of measurement configuration(s) e.g., multiple measConfig of IE(s) MeasConfigNR(s), each measConfig associated to a non-serving cell.

An example is provided below for the configuration of non-serving cells indexed by non-serving cell indexes 1, 7 and 12 respectively associated to the following TCI state(s) whose TCI state Ids are (12,15) for non-serving cell index 1, (1,7) for non-serving cell index 7, (13,5) for non-serving cell index 7:

- Non-serving cell 1, TCI state Id=12, TCI state Id=15→MeasConfig(1)
- Non-serving cell 7, TCI state Id=1, TCI state Id=7→MeasConfig(2)
- Non-serving cell 12, TCI state Id=13, TCI state Id=54→MeasConfig(3)

If the UE receives a MAC CE whose TCI state indicates a TCI state Id=1 the UE determines that this has a QCL source associated to the non-serving cell 7 and determines to apply the stored measurement configuration MeasConfig(2). That can be on top of the UE's current measurement configuration (delta configuration) and/or a full configuration For the case of full configuration, each measurement configuration is self-contained and upon the change of the serving cell based on the TCI state, the UE completely removes the previous measConfig and replaces it with the new one. All the ongoing measurements based on the previous measConfig shall be stopped by the UE.

If the UE receives a MAC CE whose TCI state indicates a TCI state Id=7 the UE determines that this has a QCL source associated to the non-serving cell 7, which is the current serving cell, i.e., the UE determines that it does NOT need to apply the stored measurement configuration MeasConfig(2).

If the UE receives a MAC CE whose TCI state indicates a TCI state Id=5 the UE determines that this has a QCL source associated to the non-serving cell 12, and determines to apply the stored measurement configuration MeasConfig (3).

If later the UE receives a MAC CE whose TCI state indicates a TCI state Id=7, the UE determines that this has a QCL source associated to the non-serving cell 7 and determines to apply again the stored measurement configuration MeasConfig(2).

Note that the same MeasConfig(2) is being applied once more. In that case, the method comprises the UE keeping each of the measConfig(s) stored, as they may be applied multiple times.

If the solution relies on delta signaling this might have further issues. For example, each MeasConfig(n) may generate as a delta signaling a signaling having a current measConfig as a reference, which may be the initial measConfig the UE has received as part of its serving cell configuration (e.g. PSCell and/or PCell measConfig). In that case, the UE always stores the initial serving cell measConfig to use as baseline. Upon reception of the MAC CE, the UE reverts its current measConfig to the initial serving cell measConfig, to then apply the stored MeasConfig(n) associated to the non-serving cell associated to the QCL configuration of the TCI state being indicated by the MAC CE.

For the case of delta configuration, there are several methods via which the delta configuration can be realized.

In one method, the UE receives a 'initial' measurement configuration and all the delta configurations are in relation to this initial measurement configuration.

In another method, the delta configuration is related to the previous measConfig that the UE was using. In this method, the UE needs to be provided with delta configuration in relation to the previous source cell. An example configuration is given below.

- Non-serving cell 1, TCI state Id=12, TCI state Id=15→MeasConfig(1a) if previous source cell is 7, MeasConfig(1b) if previous source cell is 12
- Non-serving cell 7, TCI state Id=1, TCI state Id=7→MeasConfig(2a) if previous source cell is 1, MeasConfig(2b) if previous source cell is 12
- Non-serving cell 12, TCI state Id=13, TCI state Id=5→MeasConfig(3a) if previous source cell is 1, MeasConfig(3b) if previous source cell is 7.

In this case, if the UE is currently being served with Cell-12 and if the newly received TCI state is 12, then the UE switches the serving cell to Cell-1 and uses the delta configuration as provided in measConfig (1b).

Table 1 illustrates an example of how ASN.1 signaling could be defined for the plurality of measurement configuration(s). There can be multiple non-serving cell configuration(s), each including a measurement configuration, and each having a non-serving cell index associated.

TABLE 1

Measurement Configuration Definition Example

```
nsCellToAddModList SEQUENCE (SIZE (1..maxNrofNSCells)) OF
NSCellConfig
NSCellConfig ::=            SEQUENCE {
  nsCellIndex               NSCellIndex,
  nsCellMeasconfig          MeasConfigNR    OPTIONAL,
[...]
}
```

The non-serving cell index can be used as a reference in the TCI state configuration and/or the QCL configuration.

The signaling can be further optimized in case the same measurement configuration can be considered for multiple non-serving cell(s), e.g., in case there is a set of non-serving cells in the same frequency (same SSB frequency) as the initial serving cell. An example is shown in Table 2 below where the same measurement configuration is applicable to multiple non-serving cells. As shown in Table 2 below, for each MeasConfigNR there can be a set of non-serving cell indexes.

TABLE 2

| Measurement Configuration Definition Example |
|---|
| nsCellToAddModList SEQUENCE (SIZE (1..maxNrofMeasConfig NSCells)) OF NSCellConfigMeasConfig<br>NSCellConfigMeasConfig::= SEQUENCE {<br>nsCellIndexList SEQUENCE (SIZE (1..maxNrofNSCells)) OF NSCellIndex,<br>nsCellMeasconfig MeasConfigNR OPTIONAL,<br>[...]<br>} |

An example method of delta configuration wherein the UE is configured with 'initial' configuration (initMeasConfig) and the rest of the measConfig being delta configurations with this 'initial' configuration is given in Table 3 below.

TABLE 3

| Measurement Configuration Definition Example |
|---|
| initMeasConfig MeasCOnfigNR,<br>nsCellToAddModList SEQUENCE (SIZE (1..maxNrofMeasConfig NSCells)) OF NSCellConfigMeasConfig<br>NSCellConfigMeasConfig::= SEQUENCE {<br>nsCellIndexList SEQUENCE (SIZE (1..maxNrofNSCells)) OF NSCellIndex,<br>nsCellMeasconfig MeasConfigNR OPTIONAL,<br>[...]<br>} |

An example method of delta configuration wherein the UE is configured with delta configurations for each of the possible source cell based measConfig is given in Table 4 below.

TABLE 4

| Measurement Configuration Definition Example |
|---|
| nsCellToAddModList SEQUENCE (SIZE (1..maxNrofNSCells)) OF NSCellConfig<br>NSCellConfig ::= SEQUENCE {<br>nsCellIndex NSCellIndex,<br>nsCellMeasconfigList MeasConfigNRList OPTIONAL,<br>[...]<br>}<br>MeasConfigNRList SEQUENCE (SIZE (1..maxNrofNSCells)) OF measConfigNRList<br>measConfigNRList ::= SEQUENCE {<br>previousSCellIndex NSCellIndex,<br>nsCellMeasconfigList MeasConfigNRList<br>} |

In one embodiment the lower layer entity (e.g. MAC entity where a MAC CE is received and/or processed) indicates to upper layers that a L1/L2 inter-cell mobility has occurred, e.g. in case the received MAC CE includes a TCI state whose QCL configuration is associated to a non-serving cell.

In one embodiment, after the UE receives and processes the MAC CE and accesses a non-serving cell, the UE receives an RRCReconfiguration including a measurement configuration so that its current measConfig is updated.

Figure 10:
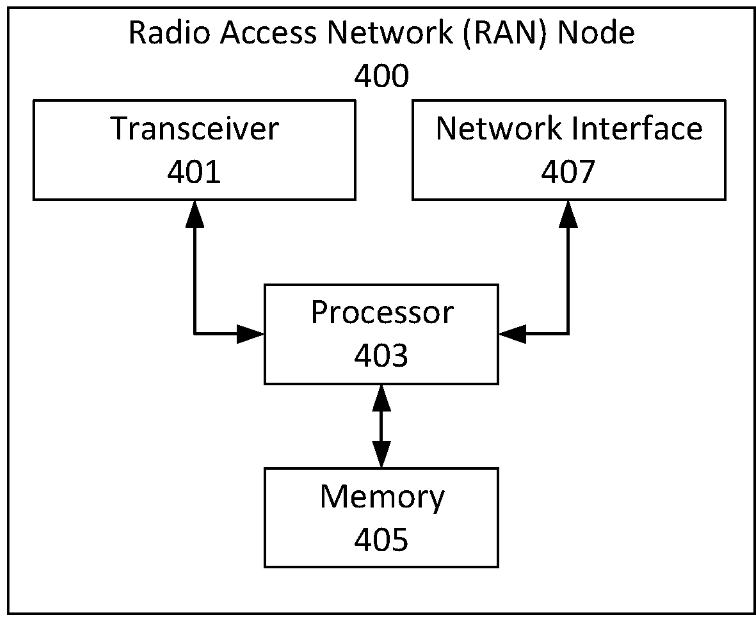
FIG. 10 is a block diagram illustrating a radio access network RAN node (e.g., a base station eNB/gNB) according to some embodiments of inventive concepts.

FIG. 10 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. As shown, the RAN node may include transceiver circuitry 401 including a transmitter and a receiver configured to provide uplink and downlink radio communications with mobile terminals. The RAN node may include network interface circuitry 407 configured to provide communications with other nodes (e.g., with other base stations) of the RAN and/or core network CN. The network node may also include processing circuitry 403 coupled to the transceiver circuitry, and memory circuitry coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals/UEs and/or to receive uplink communications through transceiver 401 from one or more mobile terminals/UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with reference to FIG. 11 related to RAN nodes). According to some embodiments, RAN node 400 and/or an element(s)/function(s) thereof may be embodied as a virtual node/nodes and/or a virtual machine/machines.

According to some other embodiments, a network node may be implemented as a core network CN node without a transceiver. In such embodiments, transmission to a UE may be initiated by the network node so that transmission to the UE is provided through a network node including a transceiver (e.g., through a base station or RAN node). According to embodiments where the network node is a RAN node including a transceiver, initiating transmission may include transmitting through the transceiver.

Operations of a RAN node 400 (implemented using the structure of Figure will now be discussed with reference to the flow chart of FIG. 11 according to some embodiments of inventive concepts. For example, modules may be stored in memory 405 of FIG. 10, and these modules may provide instructions so that when the instructions of a module are executed by respective RAN node processing circuitry 403, processing circuitry 403 performs respective operations of the flow chart.

Figure 11:
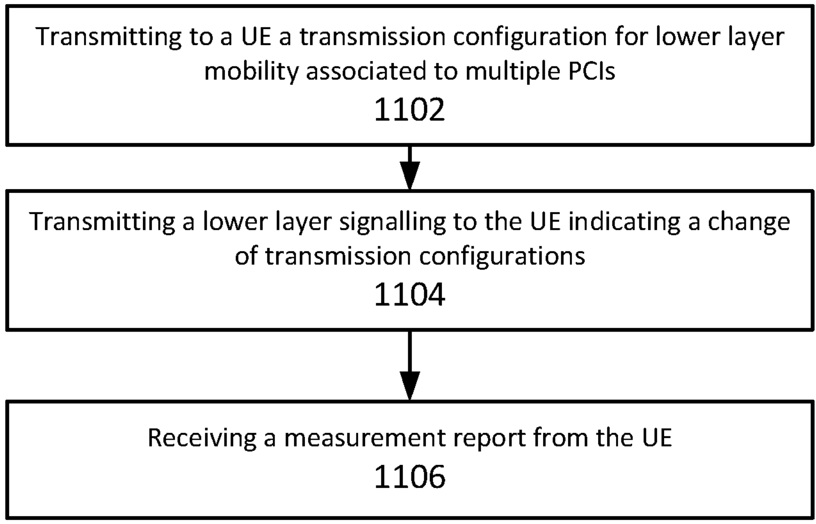
FIG. 11 is a flow chart illustrating operations of a radio access network node according to some embodiments of inventive concepts.

Referring to FIG. 11, a method of operating a radio access network, RAN, node (400) of a wireless communication system in communication with a user equipment, UE, configured with a plurality of transmission configurations for lower layer mobility and associated with one or more cells, each cell associated with one or more physical cell identities, PCIs. The method includes transmitting (1102) to the UE a transmission configuration for lower layer mobility associated to multiple PCIs. The lower layer mobility is used to trigger a change of at least a cell or a PCI upon reception of a lower layer signaling. The RAN node transmits (1104) a lower layer signaling to the UE indicating a change of transmission configuration from a first transmission configuration to a second transmission configuration, and receives (1106) a measurement report from the UE. The measurement report is based on at least one of measurements performed based on at least one element in a measurement configuration updated by the UE based on the second transmission configuration, and measurements performed based on a stored measurement configuration associated with the second transmission configuration.

The configuration for lower layer mobility may include one or more TCI state configurations wherein at least one of the TCI state configurations has a QCL configuration (e.g. a reference signal configuration e.g. an SSB index and/or a CSI-RS index) associated to at least one non-serving cell. The non-serving cell can be in a non-serving frequency.

The configuration for lower layer mobility may include a measurement configuration associated to different serving cells within which the TCI state based serving cell switching is enabled.

The lower layer signaling may include a MAC CE indicating one of the configured TCI states and determining that the QCL source reference signal is associated to a non-serving cell.

The RAN node may update the UE's measurement configuration in the UE's access stratum (AS) context at least based on one of the following UE actions: A) the UE autonomously performs at least one update to the measurement configuration; and B) the UE applies a stored measurement configuration associated to a non-serving cell (e.g. from the second transmission configuration).

The network may generate a measurement configuration (MeasConfig) for at least one of the configured non-serving cell(s) and provide the measurement configuration to the UE.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

REFERENCES

[1] 3GPP TS 38.300 v16.3.0
[2] 3GPP TS 38.331 v16.2.0
[3] 3GPP TS 38.321 v16.2.1
[4] 3GPP TS 38.211 v16.3.0
[5] 3GPP TS 38.213 v16.3.0
[6] 3GPP TS 38.133 v16.5.0

The invention claimed is:

1. A method of operating a user equipment, UE, configured with a plurality of transmission configurations for lower layer mobility and associated with one or more cells, each cell associated with one or more physical cell identities, PCIs, in a wireless communication network, the method comprising:

receiving a lower layer signaling that comprises an indication of a change of transmission configuration from a first transmission configuration to a second transmission configuration from the plurality of transmission configurations; and in response to receiving the lower layer signaling, performing the change of transmission configuration and performing an action related to a measurement configuration, wherein the action comprises applying a stored measurement configuration associated with the second transmission configuration, wherein the stored measurement configuration is indicated by a MeasConfig Information Element (IE).

2. The method of claim 1, wherein the plurality of transmission configurations comprise a plurality of transmission configuration indicator, TCI, state configurations, wherein each of the TCI state configurations comprises a quasi-co-location, QCL, configuration.

3. The method of claim 1, wherein the lower layer signaling further comprises:

an indication of one or more transmission configuration indicator, TCI, state configurations to be activated, wherein each of the one or more TCI state configurations comprises a quasi-co-location, QCL, configuration.

4. The method of claim 1, wherein the indication of change of transmission configuration from the first transmission configuration to the second transmission configuration comprises:

an indication of a transmission configuration indicator, TCI, state configuration among a plurality of TCI state configurations; and the method further comprises:

determining that a quasi-co-location, QCL, configuration is associated to a PCI which is different from a current PCI.

5. The method of claim 4, wherein the action is performed in response to determining that the QCL configuration is associated to the PCI which is different from the current PCI.

6. The method of claim 2, wherein the QCL configuration comprises a reference signal configuration.

7. The method of claim 6, wherein the reference signal configuration comprises a synchronization signal block, SSB, index or a channel state information reference signal, CSI-RS, index.

8. The method of claim 4, wherein the lower layer signaling comprises a medium access control, MAC, control element, CE.

9. The method of claim 1, wherein applying the stored measurement configuration comprises applying the stored measurement configuration based on transmission configuration indicator, TCI, state information included in the lower layer signaling.

10. The method of claim 1, wherein the stored measurement configuration comprises a delta measurement configuration that indicates differences with respect to another measurement configuration.

11. The method of claim 10, wherein the delta signaled measurement configuration is a delta configuration that indicates differences with respect to an initial measurement configuration.

12. The method of claim 1, wherein the transmission configuration comprises a mobility configuration for L1/L2 based inter-cell mobility.

* * * * *